(12) United States Patent
Furutani et al.

(10) Patent No.: US 8,750,009 B2
(45) Date of Patent: Jun. 10, 2014

(54) CONTROLLER OF A POWER CONVERTER THAT USES PULSE WIDTH MODULATION

(75) Inventors: Shinichi Furutani, Tokyo (JP); Akira Satake, Tokyo (JP); Jun Sawaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 12/810,072

(22) PCT Filed: Dec. 27, 2007

(86) PCT No.: PCT/JP2007/075206
§ 371 (c)(1),
(2), (4) Date: Jun. 22, 2010

(87) PCT Pub. No.: WO2009/084097
PCT Pub. Date: Jul. 9, 2009

(65) Prior Publication Data
US 2010/0271853 A1    Oct. 28, 2010

(51) Int. Cl.
*H02M 7/5387* (2007.01)
(52) U.S. Cl.
USPC .............................. 363/132; 363/41; 363/98
(58) Field of Classification Search
USPC .................... 363/40, 41, 95–98, 131, 132
See application file for complete search history.

(56) References Cited

U.S. PATENT DOCUMENTS

| | | | | |
|---|---|---|---|---|
| 5,212,630 A | * | 5/1993 | Yamamoto et al. | 363/71 |
| 5,257,180 A | | 10/1993 | Sashida et al. | |
| 5,909,366 A | * | 6/1999 | Sanada | 363/98 |
| 6,437,997 B1 | * | 8/2002 | Inarida et al. | 363/37 |
| 7,710,065 B2 | * | 5/2010 | Sato et al. | 318/801 |
| 2007/0069681 A1 | * | 3/2007 | Imura et al. | 318/717 |
| 2007/0090782 A1 | * | 4/2007 | Endo et al. | 318/432 |
| 2007/0091653 A1 | * | 4/2007 | Leggate et al. | 363/41 |
| 2007/0103950 A1 | * | 5/2007 | Arisawa et al. | 363/132 |

FOREIGN PATENT DOCUMENTS

| | | |
|---|---|---|
| CN | 1190279 A | 8/1998 |
| JP | 5-15070 | 1/1993 |
| JP | 6-253546 | 9/1994 |
| JP | 11-89242 | 3/1999 |
| JP | 3171505 | 5/2001 |
| JP | 2005 20838 | 1/2005 |
| JP | 2005 110335 | 4/2005 |
| JP | 2006 320160 | 11/2006 |
| JP | 2007 252143 | 9/2007 |

OTHER PUBLICATIONS

U.S. Appl. No. 12/811,742, filed Jul. 6, 2010, Furutani, et al.

(Continued)

*Primary Examiner* — Adolf Berhane
*Assistant Examiner* — Gustavo Rosario Benitez
(74) *Attorney, Agent, or Firm* — Oblon, Spivak, McClelland, Maier & Neustadt, L.L.P.

(57) ABSTRACT

A controller of a power converter including an inverter that includes plural semiconductor switching elements. The controller suppresses an error between a voltage command and an inverter output voltage and responds to a voltage command at a high speed. The controller includes a voltage command generator that generates a voltage command signal and a switching pattern calculator that calculates and outputs, based on the voltage command signal, a switching pattern of a synchronous PWM system in which an average value of an inverter output voltage matches the voltage command signal.

12 Claims, 8 Drawing Sheets

(56) References Cited

OTHER PUBLICATIONS

Office Action issued Oct. 4, 2011, in Taiwanese Patent Application No. 097127751.

Japanese Office Action issued on Feb. 29, 2012 in corresponding Japanese Application No. 2009-547841 (with a Partial English Translation).

Patel, Hasmukh S. et al., "Generalized Techniques of Harmonic Elimination and Voltage Control in Thyristor Inverters: Part I—Harmonic Elimination", IEEE Transactions on Industry Applications, vol. IA-9, No. 3, pp. 310-317, (May/Jun. 1973).

Patel, Hasmukh S. et al., "Generalized Techniques of Harmonic Elimination and Voltage Control in Thyristor Invertes: Part II—Voltage Control Techniques", IEEE Transactions on Industry Applications, vol. IA-10, No. 5, pp. 666-673, (Sep./Oct. 1974).

Chinese Office Action issued Jul. 10, 2012, in China Patent Application No. 200780102097.5 (with English Translation).

* cited by examiner

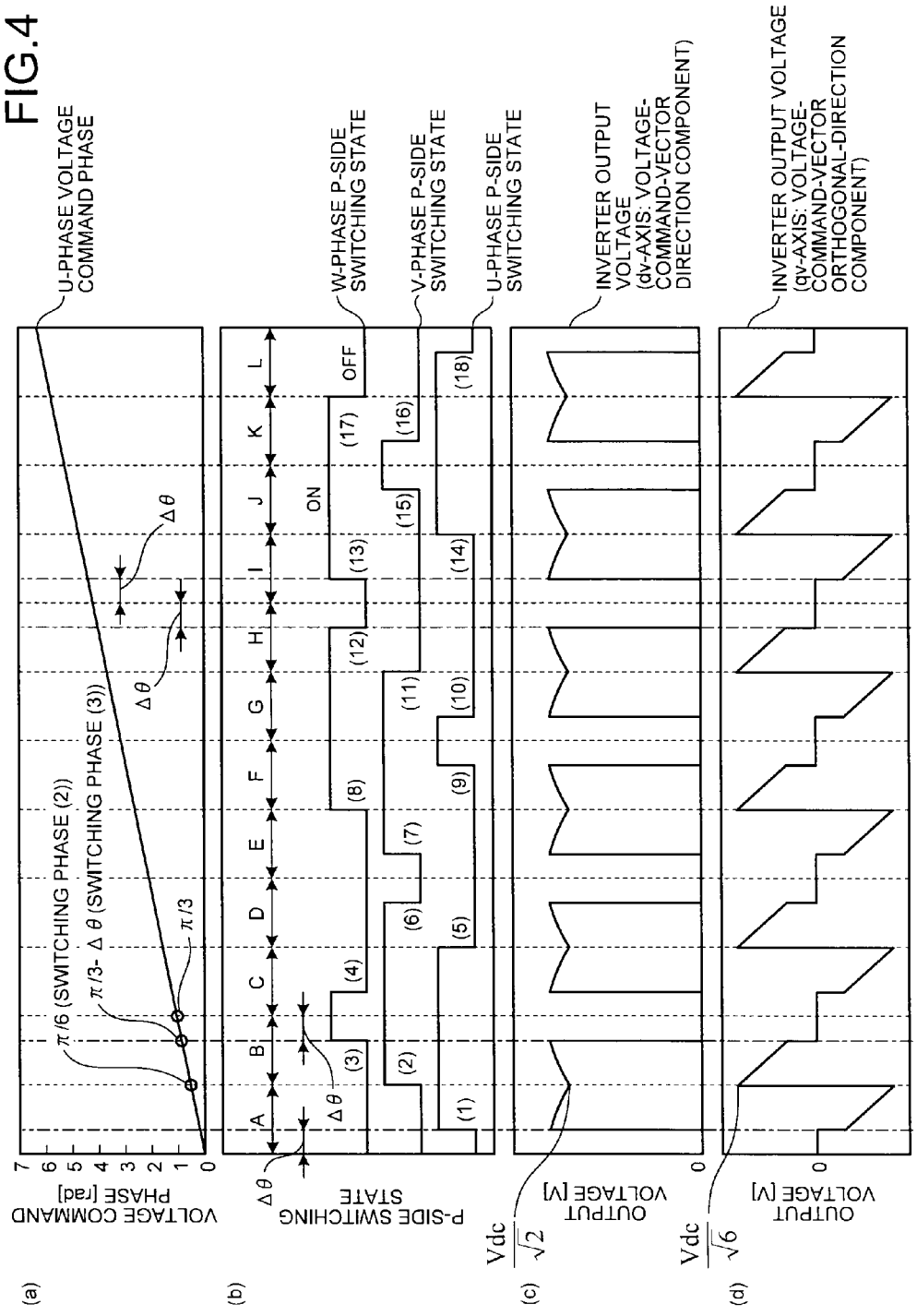

FIG.5

| No. | GROUP | VALUE | No. | GROUP | VALUE | No. | GROUP | VALUE |
|---|---|---|---|---|---|---|---|---|
| (1) | (i) | $\Delta\theta$ | (7) | (i) | $2\pi/3+\Delta\theta$ | (13) | (i) | $4\pi/3+\Delta\theta$ |
| (2) | (ii) | $\pi/6$ | (8) | (ii) | $5\pi/6$ | (14) | (ii) | $3\pi/2$ |
| (3) | (i) | $\pi/3-\Delta\theta$ | (9) | (i) | $\pi-\Delta\theta$ | (15) | (i) | $5\pi/3-\Delta\theta$ |
| (4) | (i) | $\pi/3+\Delta\theta$ | (10) | (i) | $\pi+\Delta\theta$ | (16) | (i) | $5\pi/3+\Delta\theta$ |
| (5) | (ii) | $\pi/2$ | (11) | (ii) | $7\pi/6$ | (17) | (ii) | $11\pi/6$ |
| (6) | (i) | $2\pi/3-\Delta\theta$ | (12) | (i) | $4\pi/3-\Delta\theta$ | (18) | (i) | $2\pi-\Delta\theta$ |

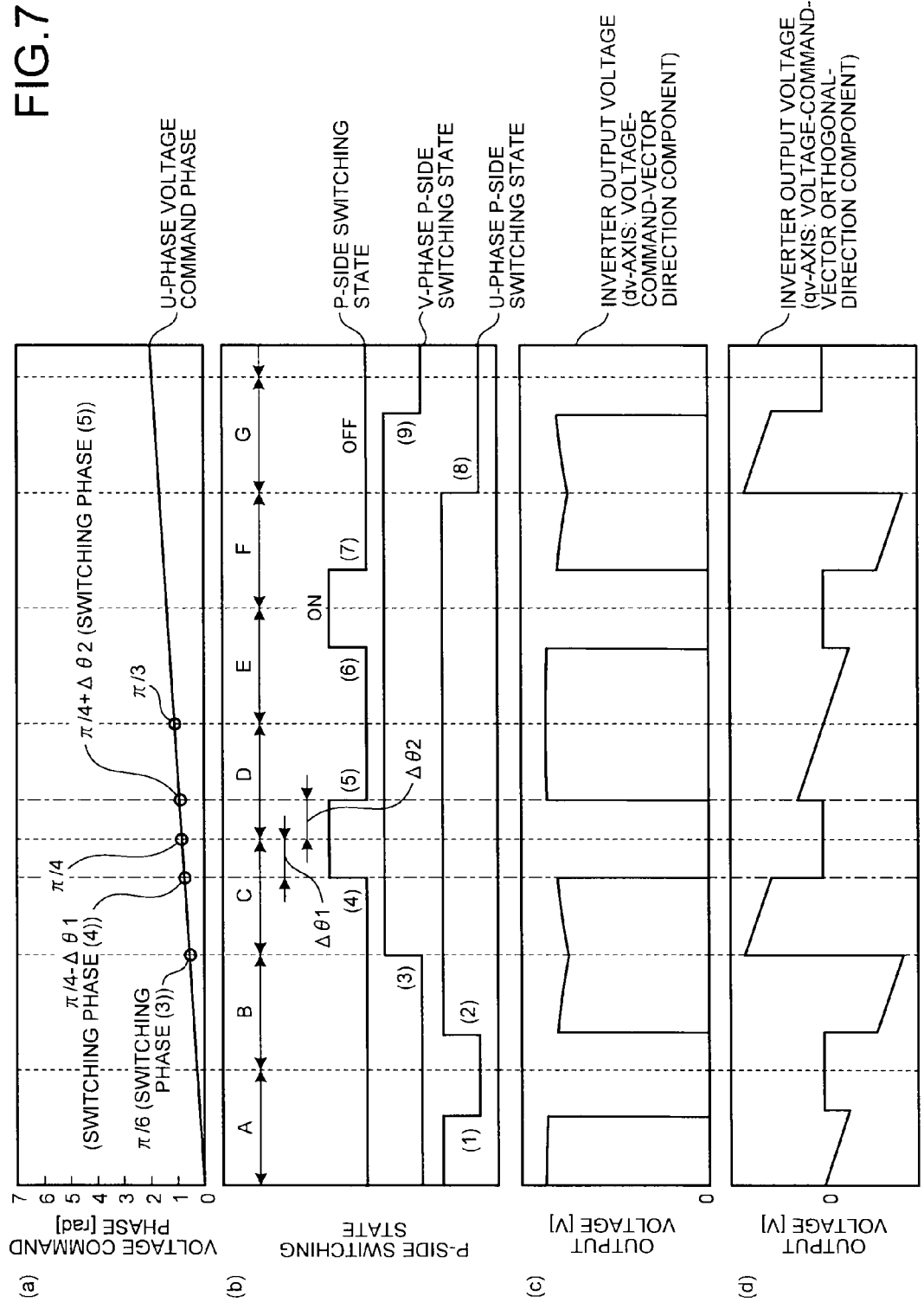

FIG.8

| No. | GROUP | VALUE | No. | GROUP | VALUE | No. | GROUP | VALUE |
|---|---|---|---|---|---|---|---|---|
| (1) | (i) | $\pi/12-\Delta\theta2$ | (11) | (i) | $3\pi/4-\Delta\theta2$ | (21) | (i) | $17\pi/12-\Delta\theta2$ |
| (2) | (i) | $\pi/12+\Delta\theta1$ | (12) | (i) | $3\pi/4+\Delta\theta1$ | (22) | (i) | $17\pi/12+\Delta\theta1$ |
| (3) | (ii) | $\pi/6$ | (13) | (ii) | $5\pi/6$ | (23) | (ii) | $3\pi/2$ |
| (4) | (i) | $\pi/4-\Delta\theta1$ | (14) | (i) | $11\pi/12-\Delta\theta1$ | (24) | (i) | $19\pi/12-\Delta\theta1$ |
| (5) | (i) | $\pi/4+\Delta\theta2$ | (15) | (i) | $11\pi/12+\Delta\theta2$ | (25) | (i) | $19\pi/12+\Delta\theta2$ |
| (6) | (i) | $5\pi/12-\Delta\theta2$ | (16) | (i) | $13\pi/12-\Delta\theta2$ | (26) | (i) | $7\pi/4-\Delta\theta2$ |
| (7) | (i) | $5\pi/12+\Delta\theta1$ | (17) | (i) | $13\pi/12+\Delta\theta1$ | (27) | (i) | $7\pi/4+\Delta\theta1$ |
| (8) | (ii) | $\pi/2$ | (18) | (ii) | $7\pi/6$ | (28) | (ii) | $11\pi/6$ |
| (9) | (i) | $7\pi/12-\Delta\theta1$ | (19) | (i) | $5\pi/4-\Delta\theta1$ | (29) | (i) | $23\pi/12-\Delta\theta1$ |
| (10) | (i) | $7\pi/12+\Delta\theta2$ | (20) | (i) | $5\pi/4+\Delta\theta2$ | (30) | (i) | $23\pi/12+\Delta\theta2$ |

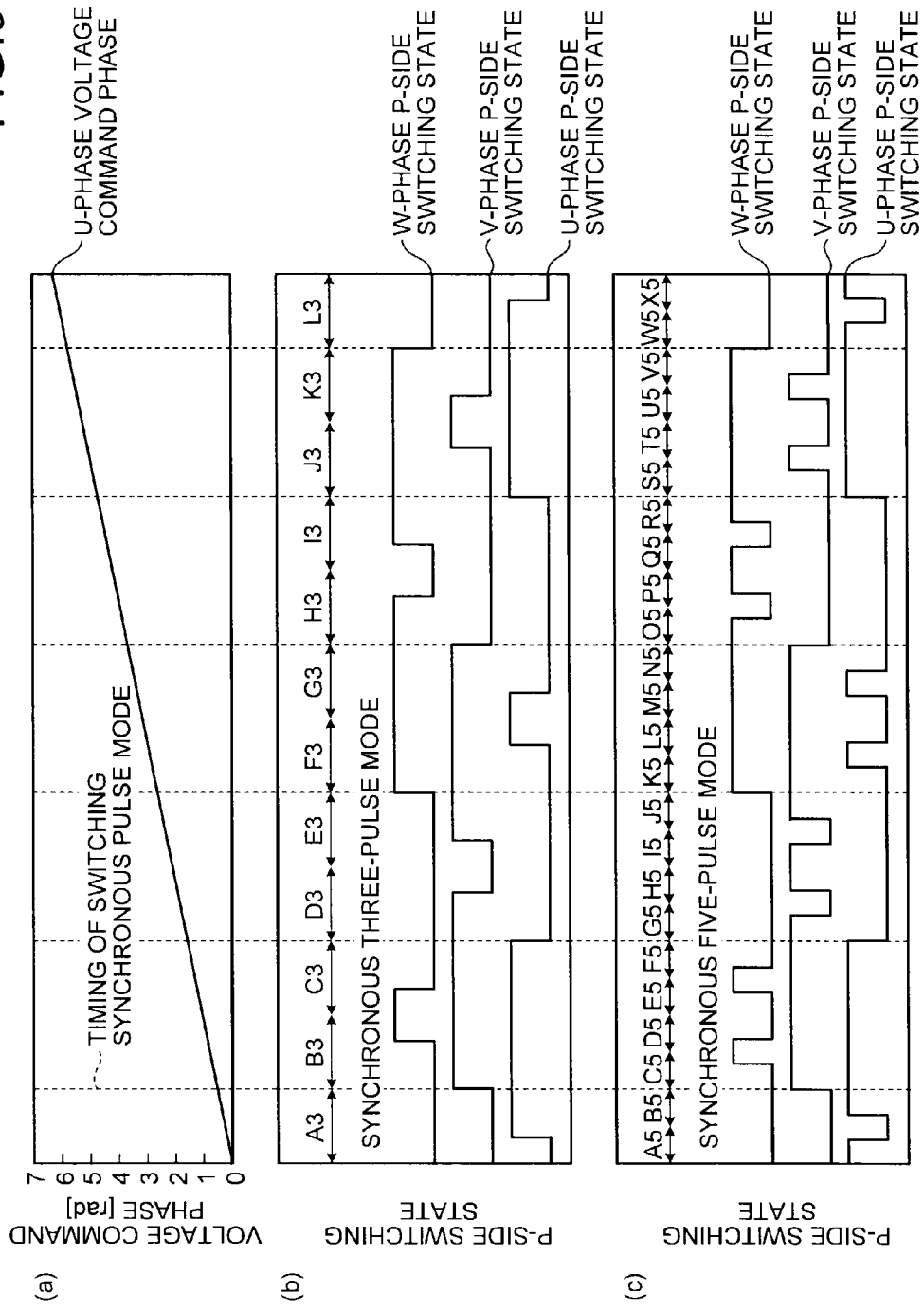

CONTROLLER OF A POWER CONVERTER THAT USES PULSE WIDTH MODULATION

TECHNICAL FIELD

The present invention relates to a controller of a power converter that has a plurality of semiconductor switching elements, and more particularly to a synchronous pulse width modulation (hereinafter, referred to as "PWM") control that synchronizes a voltage command, which is output to a PWM inverter controlled by using a PWM, with a switching pattern.

BACKGROUND ART

In a synchronous PWM control, a switching pattern to control a PWM inverter is calculated. As representative systems that calculate a switching pattern, a system that synchronizes a carrier wave such as a triangular wave with a phase angle of a voltage command (hereinafter, "carrier-wave comparison system") and a system directly referring to a phase of a voltage command (hereinafter, "phase reference system") can be exemplified. In these systems, the carrier-wave comparison system can simplify a configuration of a control system and is excellent in the responsiveness to a voltage command, whereas the phase reference system can effectively suppress a higher harmonic component contained in an inverter output voltage. Conventionally, there are many technical literatures about the carrier-wave comparison system. Nonpatent Literatures 1 and 2 and Patent Document 1 mentioned below are representative literatures about the phase reference system.

When a synchronous PWM control is performed, an approximate shape of a switching pattern can be recognized in many cases. This means that, in the synchronous PWM control, the shape of an inverter output voltage can be recognized in advance. Therefore, in the synchronous PWM control, a switching phase can be obtained in advance to be able to obtain desired characteristics of an inverter output-voltage waveform in one cycle of a voltage command.

Nonpatent Literatures 1 and 2 disclose setting methods of a switching phase that make it possible to perform suppression of a higher harmonic component contained in an inverter output voltage and assigning an arbitrary fundamental wave component. Patent Document 1 discloses a setting method of a switching phase in which a fundamental wave component contained in an inverter output-voltage waveform matches a voltage command.

Patent Document 1: Japanese Patent Application Laid-open No. H6-253546

Nonpatent Literature 1: IEEE Transactions On Industry Applications (1973, Vol.IA-9, No. 3), Generalized Techniques of Harmonic Elimination and Voltage Control in Thyristor Inverters Part I-Harmonic Elimination Nonpatent Literature 2: IEEE Transactions On Industry Applications (1974, Vol. 10, No. 5), Generalized Techniques of Harmonic Elimination and Voltage Control in Thyristor Inverters Part II-Voltage Control Techniques

DISCLOSURE OF INVENTION

Problem to be Solved by the Invention

While characteristics of the carrier-wave comparison system and the phase reference system as representative synchronous PWM control systems have been explained above, these control systems have the following technical problems.

In the carrier-wave comparison system, as far as an amplitude and a phase of a fundamental wave component of an inverter output voltage are concerned, there is a problem such that a relatively large error occurs between the amplitude and a voltage command although the phase matches a phase of the voltage command. This error is thought to have the following influences.

(1) When a motor as a load is controlled by applying an open loop control system such as a V/f control, for example, motor torque precision decreases due to excess or lack of an inverter voltage output.

(2) When a current control of a motor as a load is performed, for example, a current control gain varies equivalently.

(3) When a control of substituting an inverter output voltage with a voltage command is performed, a voltage limiter process or the like is influenced, and thus a current control system becomes unstable.

Therefore, in the carrier-wave comparison system, gain compensation or the like is performed for a voltage command.

Meanwhile, in the phase reference systems described in Nonpatent Literatures 1 and 2 and Patent Document 1 mentioned above, the responsiveness to a voltage command decreases. For example, when a current control of a motor as a load is performed, a voltage command varies minutely in order to flow a predetermined current. In the phase reference systems described in Nonpatent Literatures 1 and 2 and Patent Document 1, a switching phase of a switching pattern to obtain desired characteristics is calculated by using a Fourier analysis or the like. Therefore, it is a common procedure that a switching phase of a switching pattern in a control system is expressed by a function or a table of a voltage command amplitude. Besides, in accordance with the variation of the voltage command, the switching phase also varies minutely, and a switching phase set to obtain desired characteristics is not reproduced. Consequently, a priority control of a switching phase becomes necessary. However, when a control of prioritizing a switching phase set in advance is performed, a reflection of a voltage-command amplitude-change to a switching phase is limited to one time per one cycle or per a half cycle of a voltage command. This lowers the responsiveness to the voltage command.

In summary, the carrier-wave comparison system has a problem such that a relatively large error occurs between a voltage command and a fundamental wave component of an inverter output voltage, although the responsiveness to a change of a voltage command becomes relatively fast. The phase reference system has a problem such that the responsiveness to a voltage command is lowered, particularly when the system is to obtain desired characteristics by a switching phase set by using Fourier analysis.

The present invention has been made in view of the above, and an object of the invention is to provide a controller of a power converter capable of suppressing an error between a voltage command and an inverter output voltage and capable of responding to a voltage command at a high speed, even when a phase reference system is applied.

Means for Solving Problem

To solve the problem described above and achieve the object, there is provided a controller of a power converter according to the present invention, applied to a power converter having an inverter that has a plurality of switching elements and controls the switching elements of the inverter by using a pulse width modulation, wherein the controller includes: a voltage-command generator that generates a voltage command signal; and a switching pattern calculator that calculates a switching pattern to control the semiconductor switching elements of the inverter based on the voltage command signal, and the switching pattern calculator calculates a switching pattern of a synchronous PWM system, and outputs a switching pattern in which an average value (an output-voltage average value) of output voltages output from the inverter matches the voltage command.

Effect of the Invention

According to the controller of a power converter of the present invention, a switching pattern calculator calculates a switching pattern of a synchronous PWM system, and outputs a switching pattern in which an average value of inverter output voltages matches a voltage command. Therefore, even when a phase reference system is applied, the controller can suppress an error between a voltage command and an inverter output voltage and can respond to a switching command at a high speed.

BRIEF DESCRIPTION OF DRAWINGS

FIGS. 4(a) to 4(d) are explanatory diagrams of an operation of the controller according to the first embodiment.

FIG. 5 is a table for classifying a switching operation of an inverter controlled by the controller according to the first embodiment by a phase timing.

FIGS. 7(a) to 7(d) depict enlarged sections A to G shown in FIG. 6.

FIG. 8 is a table for classifying a switching operation in a synchronous five-pulse mode by a phase timing.

FIGS. 9(a) to 9(c) are explanatory diagrams of an operation of a controller according to a fourth embodiment.

EXPLANATIONS OF LETTERS OR NUMERALS

Figure 1:
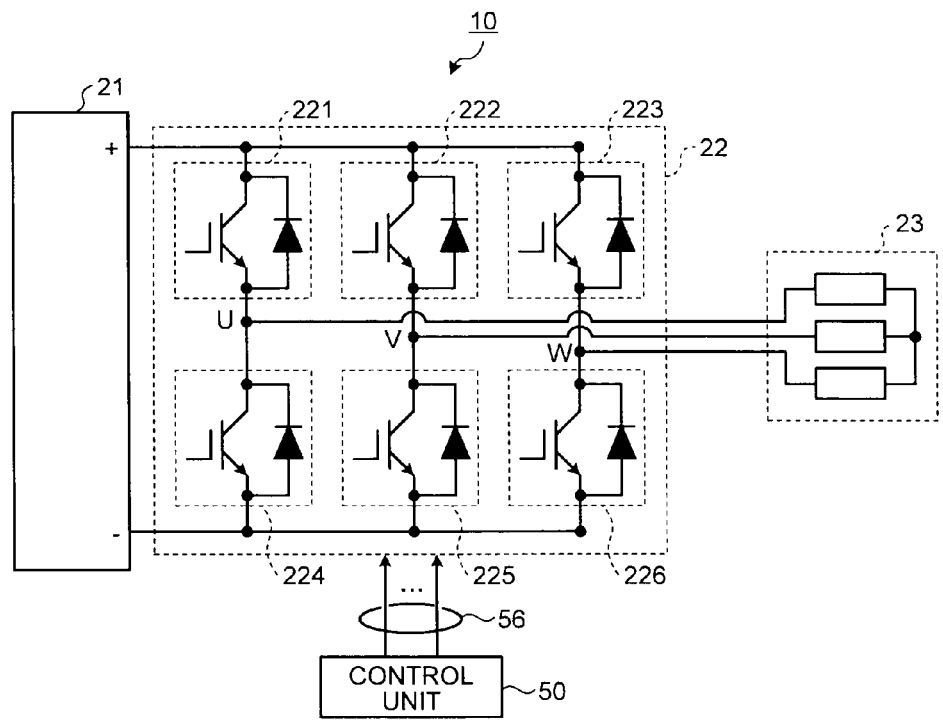
FIG. 1 depicts a basic configuration of a power converter according to a first embodiment of the present invention.

10 Power converter
21 Direct-current power source
22 Inverter
221 Semiconductor switching element (U-phase P-side)
222 Semiconductor switching element (V-phase P-side)
223 Semiconductor switching element (W-phase P-side)
224 Semiconductor switching element (U-phase N-side)
225 Semiconductor switching element (V-phase N-side)
226 Semiconductor switching element (W-phase N-side)
23 Load
50 Control unit
51 Voltage command generator
52 Voltage command signal (d-axis on biaxial orthogonal-rotational-coordinate)
53 Voltage command signal (q-axis on biaxial orthogonal-rotational-coordinate)
54 Switching pattern calculator
541 Phase calculator
542 Phase signal (on dq coordinate system)
544 Voltage-command phase signal (U-phase)
546 Voltage-command norm signal
548 Sampled-held voltage-command norm signal
543 Adder
545 Norm calculator
547 Sampling and holding (S/H) unit
549 Switching phase calculator
55 Coordinate-conversion phase signal
550 Switching phase signal
551 Phase comparing unit
56 Switching pattern signal

BEST MODE(S) FOR CARRYING OUT THE INVENTION

Exemplary embodiments of a controller of a power converter according to the present invention will be explained below in detail with reference to the accompanying drawings. The present invention is not limited to the embodiments.

First Embodiment

FIG. 1 depicts a basic configuration of a power converter according to a first embodiment of the present invention. As shown in FIG. 1, a power converter 10 is configured to include a direct-current power source 21, an inverter 22, and a control unit 50 that controls semiconductor switching elements 221 to 226 of the inverter 22 by using a PWM. The power converter 10 is connected to a load 23. The direct-current power source 21 supplies a direct-current power to the inverter 22. The inverter 22 includes the semiconductor switching elements 221 to 223 as semiconductor switching elements at a P side, and the semiconductor switching elements 224 to 226 as semiconductor switching elements at an N side. The inverter 22 forms a series circuit having a series connection between the semiconductor switching element 221 as a semiconductor switching element at the P side and the semiconductor switching element 224 as a semiconductor switching element at the N side. Both ends of this series circuit are connected to positive and negative power source terminals of the direct-current power source 21. A relationship between the semiconductor switching element 222 and the semiconductor switching element 225, and a relationship between the semiconductor switching element 223 and the semiconductor switching element 226 are the same, and both ends of each series circuit are also connected to the positive and negative power source terminals of the direct-current power source 21. FIG. 1 depicts a configuration of a two-level three-phase inverter, as an example; however, the configuration of the inverter is not limited thereto, and a power converter including an inverter other than the two-level three-phase inverter can be also used.

Figure 2:
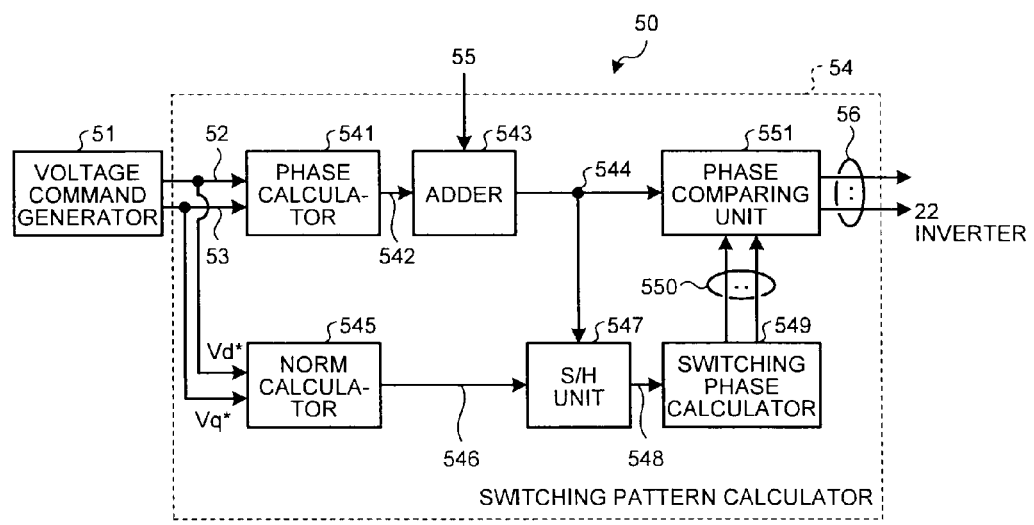
FIG. 2 is a block diagram of a functional configuration of a controller of a power converter according to the first embodiment.

FIG. 2 is a block diagram of a functional configuration of the controller of a power converter according to the first embodiment, and depicts details of a configuration of the control unit 50 shown in FIG. 1. The control unit 50 includes a voltage command generator 51 and a switching pattern calculator 54. The switching pattern calculator 54 includes a phase calculator 541, an adder 543, a norm calculator 545, a sampling and holding unit (hereinafter "S/H unit") 547, a switching phase calculator 549, and a phase comparing unit 551.

Figure 3:
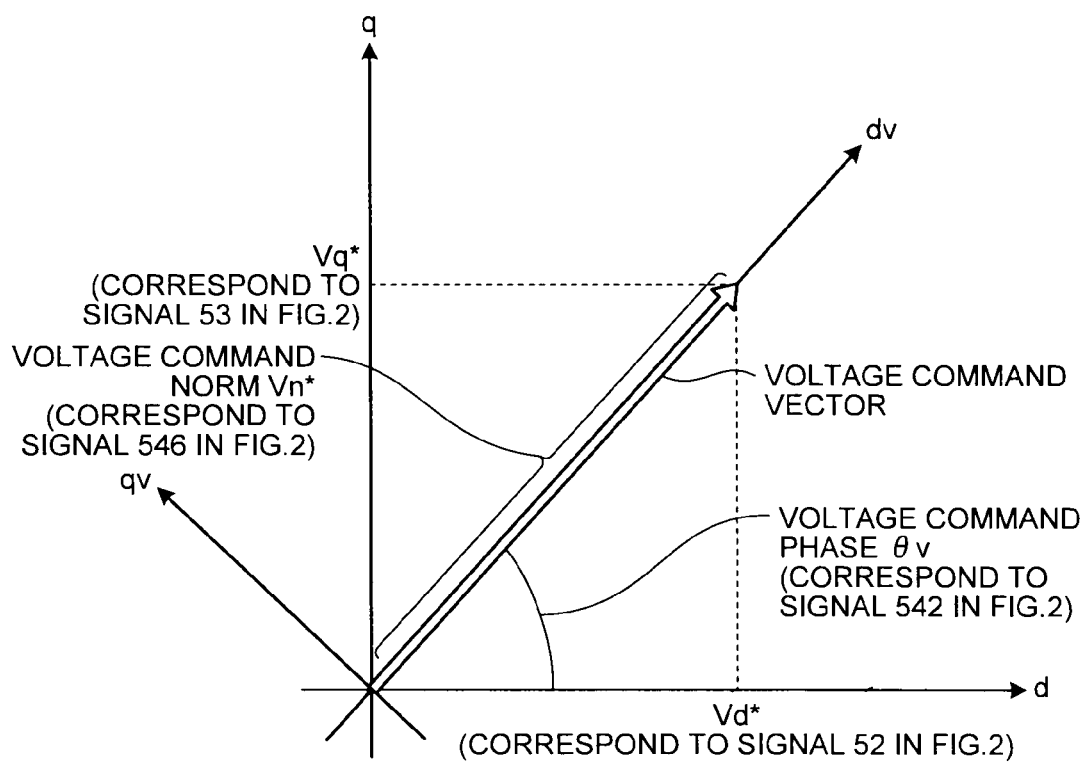
FIG. 3 depicts a relationship between a voltage command vector input to a switching pattern calculator and a dq coordinate system of each signal processed by the switching pattern calculator.

An operation of the controller according to the first embodiment is explained next with reference to FIG. 2 and FIG. 3. FIG. 3 depicts a relationship between a voltage command vector input to the switching pattern calculator 54 and a biaxial orthogonal-rotational-coordinate system (hereinafter, "dq coordinate system") of each signal processed by the switching pattern calculator 54.

In FIG. 2, the voltage command generator 51 outputs voltage command signals 52 and 53 in the dq coordinate system to the switching pattern calculator 54. The voltage command signal 52 is a voltage command component in a d-axis direction, and the voltage command signal 53 is a voltage command component in a q-axis direction. The input voltage command signals 52 and 53 are then input to the phase calculator 541 to calculate a phase signal 542. The phase calculator 541 is a functional unit that performs an arc tangent calculation. The phase signal 542 calculated by the phase calculator 541 and the input voltage command signals 52 and 53 have a relationship shown in FIG. 3.

When the voltage command signal 52 is Vd*, the voltage command signal 53 is Vq*, and the phase signal 542 is θv, a relationship of the following equation is established. The phase calculator 541 can obtain the phase signal 542 by directly calculating this equation or by referring to a table prepared in advance.

$$\theta v = \arctan\left(\frac{Vq^*}{Vd^*}\right) \quad (1\text{-}1)$$

The adder 543 adds the phase signal 542 to a coordinate-conversion phase signal 55, and obtains a voltage-command phase signal 544 on a two-phase stationary coordinate system (hereinafter, "αβ coordinate system"). The adder 543 performs this adding process and a process of accommodating added phase signals within a range of 0π to 2π. The norm calculator 545 calculates a voltage-command norm signal 546 from the voltage command signals 52 and 53. FIG. 3 also depicts a relationship between the voltage-command norm signal 546 and other signals.

When the voltage-command norm signal 546 is Vn*, a relationship of the following equation is established. The norm calculator 545 can obtain the voltage-command norm signal 546 by directly calculating this equation or by referring to a table, in a similar manner to that of obtaining the phase signal 542.

$$Vn^* = \sqrt{(Vd^*)^2 + (Vq^*)^2} \quad (1\text{-}2)$$

The S/H unit 547 samples and holds the voltage-command norm signal 546 obtained by the norm calculator 545, and inputs this signal to the switching phase calculator 549. The switching phase calculator 549 calculates a switching phase signal 550. The phase comparing unit 551 outputs a switching pattern signal 56 by referring to the voltage-command phase signal 544 and the switching phase signal 550. The switching pattern signal 56 is output to the inverter 22. That is, each semiconductor switching element is controlled in accordance with the switching pattern signal 56.

The switching phase signal 550 and the switching pattern signal 56 are shown by plural arrows in FIG. 2. These signals correspond to control signals to semiconductor switching elements of the inverter 22. That is, the number of outputs of the switching phase signal 550 and the switching pattern signal 56 changes depending on the number of phases of the power converter and a kind of the number of levels.

An operation of the switching phase calculator 549 is explained next. The switching phase calculator 549 calculates the switching phase signal 550 from the voltage-command norm signal 546 in this example. An index called an average value of output voltages output from the inverter 22 (hereinafter, simply "output-voltage average value") is introduced as an evaluation index of a switching pattern calculation. High precision of an output voltage can be achieved by providing a switching pattern in which this output-voltage average value matches a voltage command.

Preferably, the output-voltage average value and the voltage command are values in the dq coordinate system. This is because the dq coordinate system as a rotational coordinate can take into account a phase change following a time progress, in considering the output-voltage average value. By this control, an error generated when comparing a phase change with the average value in the αβ coordinate system can be suppressed, and a phase delay of an inverter output voltage can be suppressed as a result of this control.

A switching pattern calculation can be simplified by using the output-voltage average value as a component of the dq coordinate system in a voltage-command vector direction. Conversely, when the output-voltage average value is not a component in the voltage-command vector direction, an average value in each of the d-axis component and the q-axis component needs to be considered. However, both cannot be simultaneously satisfied sometimes in the switching pattern calculation, and in such a case, an operation of setting priorities of the both components is necessary. This kind of calculation can be omitted by using a component in the voltage-command vector direction. In the synchronous PWM control, a switching pattern is output synchronously with a voltage command phase of the αβ coordinate system. Therefore, the output-voltage average value is calculated preferably based on a phase of the αβ coordinate system.

Operations of the switching phase calculator 549 and the phase comparing unit 551 are explained next with reference to FIG. 4 and FIG. 5. FIGS. 4(a) to 4(d) are explanatory diagrams of an operation of the controller according to the first embodiment, and FIG. 5 is a table for classifying a switching operation of an inverter controlled by the controller according to the first embodiment by a phase timing. For the sake of explanation, a two-level three-phase inverter is taken as an example, and a case that this inverter is controlled in a synchronous three-pulse mode is explained.

In FIG. 4, FIG. 4(a) depicts a time in a lateral axis, and depicts a phase of a U-phase voltage command (a U-phase voltage-command phase) in a vertical axis. FIGS. 4(b) to 4(d) depict a time in a lateral axis, a P-side switching pattern in each phase in a vertical axis, and inverter output voltages, respectively. As shown in FIG. 4(a), time and a U-phase voltage command are in a proportional relationship, and therefore FIGS. 4(b) to 4(d) can be regarded as a relationship with respect to the U-phase voltage-command phase.

FIGS. 4(c) and (d) depict waveforms of an output voltage of the inverter observed on the dq coordinate system. FIG. 4(c) depicts a component in a voltage-command vector direction (hereinafter, "voltage-command-vector direction component") and FIG. 4(d) depicts a waveform of a component in a direction orthogonal to the voltage-command vector direction (hereinafter, "voltage-command-vector orthogonal-direction component"). Although a voltage command waveform of a U-phase is not shown in FIG. 4, it can be obtained by a cosine calculation of a phase in FIG. 4(a).

As shown in FIG. 4, when a two-level three-phase inverter is controlled in a synchronous three-pulse mode, switching occurs 18 times in one cycle of a voltage command phase. In FIG. 4(b), switching can be classified into a switching group in which a phase timing changes depending on a size of a voltage command (hereinafter, "i group") and a switching group in which a phase timing does not change (hereinafter, "ii group"). For the sake of explanation, numbers (1) to (18) are given to switching operation points (hereinafter, simply "operation point") (see FIG. 4(b) and FIG. 5). As far as operation points of the ii group and an intermediate point of these operation points are concerned, a section can be divided into 12 sections including sections A to L as shown in FIG. 4(b).

In these sections, a start or an end becomes an operation point, and each section necessarily includes operation points of the i group at one position. Therefore, these sections become a minimum section capable of controlling the output-voltage average value, for the following reasons. In each section defined above, while operation points of the ii group are fixed points to determine a start or an end of each section, operation points of the i group are changeable within each section.

As shown in FIG. 4(b), $\Delta\theta$ is introduced as a parameter to determine a switching timing in the section A. When this $\Delta\theta$ is used, a phase timing of each switching takes a value as shown in FIG. 5. Each of these values corresponds to the switching phase signal 550 output from the switching phase calculator 549 (see FIG. 2).

That is, in each section, a timing of switching in the section A (phase: $\Delta\theta$) is controlled such that the voltage-command-vector direction component of the inverter output shown in FIG. 4(c) matches the voltage command. For example, in a section starting at an operation point (2), that is, the section B, a timing control becomes possible at an operation point (3) by manipulating $\Delta\theta$.

In the section B, before the operation point (3), switching in phases U, V, and W becomes "on", "on", and "off", respectively. When a load is balanced, an output voltage in each phase of the inverter can be expressed by the following equations, where Vdc denotes an output voltage of the direct-current power source 21.

$$Vu = \frac{1}{3}Vdc \quad (1\text{-}3)$$

$$Vv = \frac{1}{3}Vdc \quad (1\text{-}4)$$

$$Vw = -\frac{2}{3}Vdc \quad (1\text{-}5)$$

When the value is converted into a value on the αβ coordinate system, it is expressed by the following equations.

$$V\alpha = \frac{1}{2}\sqrt{\frac{2}{3}}Vdc \quad (1\text{-}6)$$

$$V\beta = \frac{1}{\sqrt{2}}Vdc \quad (1\text{-}7)$$

These are then coordinate-converted into values on a rotational coordinate. When the U-phase voltage-command phase shown in FIG. 4(a) is used, a vector component can be divided into a voltage-command-vector direction component (hereinafter, "dv-axis") and a voltage-command-vector orthogonal-direction component (hereinafter, "qv-axis"). FIG. 3 depicts details of the dv-axis and the qv-axis.

When the U-phase voltage-command phase shown in FIG. 4(a) is θvu, voltages can be expressed by the following equations, where θvu corresponds to the voltage-command phase signal 544 output from the adder 543 (see FIG. 2).

$$Vdv = \sqrt{\frac{2}{3}}Vdc \cdot \sin\left(\theta vu + \frac{\pi}{6}\right) \quad (1\text{-}8)$$

$$Vqv = \sqrt{\frac{2}{3}}Vdc \cdot \cos\left(\theta vu + \frac{\pi}{6}\right) \quad (1\text{-}9)$$

To calculate an average voltage in the dv-axis, integration is performed in each section, and a result of the integration is divided by a phase. This dv-axis average value is controlled to match the voltage command norm Vn*.

For example, in the section B, control is performed to establish the following equation. This equation takes into account a fact that a voltage is zero in a phase after the operation point (3).

$$Vn^* = \frac{6}{\pi}\int_{\pi/6}^{\pi/3-\Delta\theta}\left\{\sqrt{\frac{2}{3}}Vdc \cdot \sin\left(\theta vu + \frac{\pi}{6}\right)\right\}d\theta \quad (1\text{-}10)$$

When the equation (1-10) is solved, $\Delta\theta$ is expressed by the following equation. This $\Delta\theta$ can be calculated each time, or can be prepared in a table that corresponds to the voltage command norm Vn*.

$$\Delta\theta = \sin^{-1}\left(\frac{1}{2} - \sqrt{\frac{3}{2}} \cdot \frac{Vn^*}{Vdc} \cdot \frac{\pi}{6}\right) \quad (1\text{-}11)$$

While the section B is explained in the equation (1-11), the above explanation is similarly applied to other sections as well. Waveforms in other sections are either the same as the waveform in the section B or are bilaterally symmetrical. Therefore, $\Delta\theta$ can be calculated by using the equation (1-11) or by an equation equivalent thereto.

Although the order of explanation is opposite, the switching phase calculator 549 obtains $\Delta\theta$ following the equation (1-11) from a voltage-command norm signal 548 (Vn*), and outputs the switching phase signal 550 as shown in FIG. 5. The phase comparing unit 551 refers to the switching phase signal 550 and the voltage-command phase signal 544, and calculates the switching pattern signal 56 to be given to each phase, as shown in FIGS. 4(a), 4(b), and FIG. 5.

In the configuration of the controller shown in FIG. 2, the S/H unit 547 is not necessarily an essential component. For example, when a voltage command varies minutely such as when the voltage command generator 51 performs a current control, a phenomenon called chattering occurs and there is a risk that a switching operation is repeated for many times. The S/H unit 547 is effective to prevent such chattering and can contribute to a stable operation of the power converter.

When a sampling and holding timing of the S/H unit 547 is at a boundary of a section for calculating the output-voltage average value shown in FIG. 4, for example, this is convenient because the timing is consistent with updating of the inverter output voltage. A sampling and holding timing other than the above can be also suitably set by matching a load and a control mode of the voltage command generator 51. For example, when sampling and holding finer than the above timing is performed, waste of time can be suppressed and the responsiveness can be improved.

As explained above, according to the controller of a power converter of the present embodiment, the controller calculates and outputs a switching pattern in which an output-voltage average value matches a voltage command. Therefore, an error between the voltage command and the inverter output voltage can be suppressed, and a voltage in high precision can be obtained, even when a synchronous PWM control is applied.

According to the controller of a power converter of the present embodiment, the output-voltage average value using an evaluation index of calculating a switching pattern is calculated by using a value on the dq-coordinate system. Therefore, a phase delay of an output voltage can be suppressed.

According to the controller of a power converter of the present embodiment, a voltage-command-vector direction component is used for an output-voltage average value. Therefore, calculation of a switching pattern can be simplified.

Further, according to the controller of a power converter of the present embodiment, the controller uses an average value of output-voltage in sections obtained by dividing the voltage command phase into plural sections, for an output-voltage average value. Therefore, a response to the voltage command can be performed at a high speed.

As explained above, according to the controller of a power converter of the first embodiment, it is possible to effectively achieve the compatibility of the precision of voltage commands and responsiveness, which conventional synchronous PWM control systems do not have.

Second Embodiment

In the first embodiment, a case of controlling a two-level three-phase inverter in a synchronous three-pulse mode has been described as an example. When control is performed in other pulse modes, calculation of a switching pattern can be also performed in a similar manner to that of the first embodiment.

Figure 6:
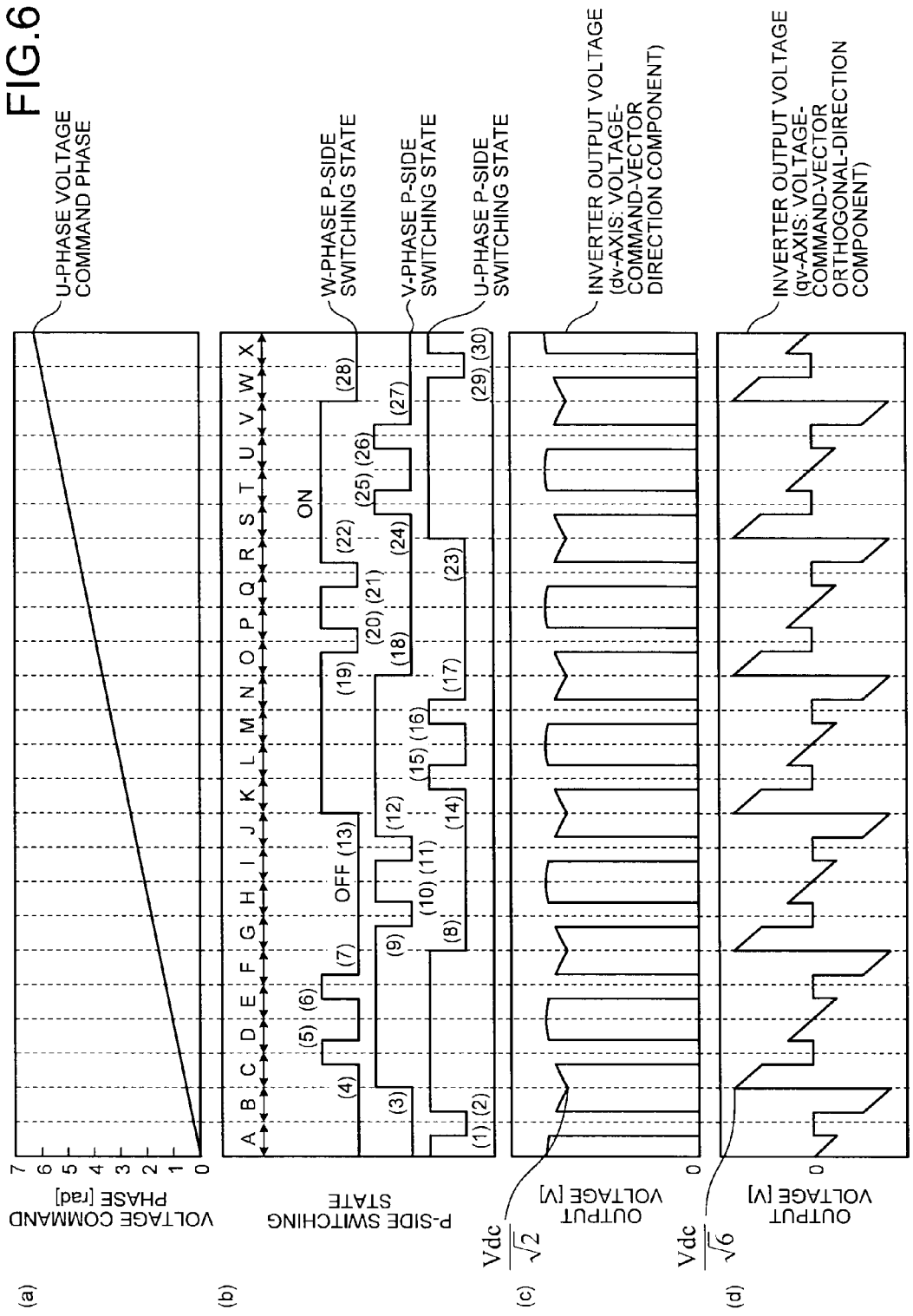
FIGS. 6(a) to 6(d) are explanatory diagrams of an operation of a controller according to a second embodiment.

FIG. 6(a) depicts a U-phase voltage-command phase in a similar manner to that in FIG. 4(a). Meanwhile, FIGS. 6(b) to 6(d) depict a P-side switching pattern in each phase when the two-level three-phase inverter is controlled in a synchronous five-pulse mode, and inverter output voltages in this case. As shown in these drawings, in the synchronous five-pulse mode, a switching operation is performed 30 times in one cycle of a voltage command, and the voltage command phase is divided into 24 parts. For the sake of explanation, numbers (1) to (30) are given to operation points, and symbols from A to X are given to respective sections.

An operation of a controller according to a second embodiment is explained next with reference to FIG. 7 and FIG. 8. FIGS. 7(a) to 7(d) depict sections A to G shown in FIG. 6 in an enlarged manner, and FIG. 8 is a table for classifying a switching operation in the synchronous five-pulse mode by a phase timing. Explanations of operations are given by focusing on the section C and the section D.

In FIG. 7, inverter output-voltage waveforms in the voltage-command-vector direction components in the section C and the section D are different from those in the synchronous three-pulse mode of the first embodiment (see FIG. 4). As is clear from a comparison between FIG. 7(b) and FIG. 4(b), two kinds of $\Delta\theta$, that is, $\Delta\theta 1$ and $\Delta\theta 2$, are necessary to determine a timing in the synchronous five-pulse mode of the second embodiment. When these $\Delta\theta 1$ and $\Delta\theta 2$ are used, a phase timing of each switching takes a value as shown in FIG. 8, and these values correspond to the switching phase signal 550 output from the switching phase calculator 549 (see FIG. 2).

In the section C and the section D, P-side switching states in the U, V, and W phases are "on", "on", and "on", respectively, after an operation point (4) and before an operation point (5). In this case, because N-side switching states in the U, V, and W phases are "off", "off", and "off", these sections become zero voltage sections. In contrast, P-side switching states in the U, V, and W phases are "on", "on", and "off", respectively in other than these zero voltage sections, and are the same as that in the section B explained in the first embodiment. Therefore, inverter output-voltage waveforms in other than the zero voltage sections can be expressed by the equation (1-8) and the equation (1-9) in the dv-axis direction and the qv-axis direction, respectively. Accordingly, in the section C, the following equation taking into account the zero voltage section is calculated so that an average value in the dv-axis direction matches the voltage command norm $Vn^*$.

$$Vn^* = \frac{12}{\pi}\int_{\pi/6}^{\pi/4-\Delta\theta 1}\left\{\sqrt{\frac{2}{3}}\,Vdc\cdot\sin\!\left(\theta vu + \frac{\pi}{6}\right)\right\}d\theta \qquad (2\text{-}1)$$

Similarly, in the section D, the following equation taking into account the zero voltage section is calculated so that an average value in the dv-axis direction matches the voltage command norm $Vn^*$.

$$Vn^* = \frac{12}{\pi}\int_{\pi/4+\Delta\theta 2}^{\pi/3}\left\{\sqrt{\frac{2}{3}}\,Vdc\cdot\sin\!\left(\theta vu + \frac{\pi}{6}\right)\right\}d\theta \qquad (2\text{-}2)$$

When the equation (2-1) and the equation (2-2) are solved, $\Delta\theta 1$ and $\Delta\theta 2$ are expressed in the following equations. These $\Delta\theta 1$ and $\Delta\theta 2$ can be calculated each time, or can be prepared in a table that corresponds to the voltage command norm $Vn^*$, in a similar manner to that of the first embodiment.

$$\Delta\theta 1 = \frac{5}{12}\pi - \cos^{-1}\!\left(\frac{1}{2} - \frac{\pi}{12}\sqrt{\frac{3}{2}}\cdot\frac{Vn^*}{Vdc}\right) \qquad (2\text{-}3)$$

$$\Delta\theta 2 = -\frac{5}{12}\pi + \cos^{-1}\!\left(\frac{\pi}{12}\sqrt{\frac{3}{2}}\cdot\frac{Vn^*}{Vdc}\right) \qquad (2\text{-}4)$$

While the section C and the section D have been explained with the equation (2-3) and the equation (2-4), the above explanation is similarly applied to other sections. Specifically, in the switching phase shown in FIG. 8, an output-voltage average value can match a voltage command by performing a switching control shown in FIG. 6(b).

As for the section for calculating an output-voltage average value, in the two-level three-phase inverter explained in the first embodiment, this section becomes a voltage command phase divided by "6n−6", where n is a number of synchronous pulses. That is, the number of times of switching a semiconductor switching element increases based on an increase of the number of synchronous pulses, and an operable amount (degree of freedom) is expressed in addition to the amplitude and phase of an output voltage. In Nonpatent Literatures 1 and 2 mentioned above, the degree of freedom is used to reduce higher harmonics. In the present embodiment, the degree of freedom is used to increase the number of times of updating an inverter output voltage. In this respect, utilization of the degree of freedom is very different from that in Nonpatent Literatures 1 and 2.

Third Embodiment

In the first embodiment, an embodiment in which, a voltage-command phase section for calculating an output-voltage average value is divided into 12 parts when a two-level three-phase inverter is controlled in a synchronous three-pulse mode, has been described as an example. In the second embodiment, an embodiment in which a voltage-command phase section for calculating an output-voltage average value is divided into 24 parts when the two-level three-phase inverter is controlled in the synchronous five-pulse mode, has been described as an example. In contrast, a third embodiment is an embodiment in which these numbers of division are set to a half. That is, by setting two adjacent sections as a new section, the number of sections is reduced and the calculation time and processing time are shortened.

As a concept of setting two adjacent sections as a new section, it suffices that the following two conditions are satisfied:

(1) an inverter output voltage in a qv-axis is zero; and
(2) when a point at which an output voltage becomes zero is a boundary point of sections, waveforms of adjacent sections are symmetrical about a point. For example, in the embodiment shown in FIG. 4, the above two conditions are satisfied at a boundary point between the section B and the section C, as shown in FIG. 4(d). Therefore, the section A and the section B are set as one section, and the section C and the section D are also set as one section. In this way, "A, B", "C, D", "E, F", "G, H", "I, J", and "K, L" become new sections in voltage phase sections in one cycle of a voltage command phase. The same $\Delta\theta$ can be used in these sections.

When the above control is performed, the number of times of updating an output-voltage average value is reduced, and thus the response performance decreases as a result. However, an average value of a voltage-command vector orthogonal component (a qv-axis component) in the output-voltage average value can be set to zero, and therefore the precision of an output voltage can be improved. This point can be explained as follows.

Controlling a power converter by a two-level three-phase inverter in the synchronous three-pulse mode is taken as an example in a similar manner to that explained above. For example, in FIG. 4(b), in a section AB having combined the section A and the section B, a voltage in the qv-axis is calculated. The calculation order is the same as that described in the first embodiment, and therefore detailed explanations thereof will be omitted. A voltage can be expressed by the following equation (3-1), in a section before the operation point (2) (an original section A). However, this equation gives a value in a phase after the operation point (1), and a qv-axis voltage becomes zero in a phase before the operation point (1). Further, a voltage can be expressed by the following equation (3-2) in a section after the operation point (2) (an original section B). In this case, the qv-axis voltage becomes zero in a phase after the operation point (3).

$$Vqv = -\sqrt{\frac{3}{2}} \, Vdc \cdot \sin(\theta vu) \qquad (3\text{-}1)$$

$$Vqv = -\sqrt{\frac{3}{2}} \, Vdc \cdot \cos\left(\theta vu + \frac{\pi}{6}\right) \qquad (3\text{-}2)$$

Next, an average value is calculated from the equation (3-1) and the equation (3-2). When a zero voltage section is considered, an output-voltage average value in the qv-axis direction (Vqv_AV) is derived by an equation (3-3) in the section A, and is derived by an equation (3-4) in the section B.

$$\text{Vqv\_AV} = \frac{6}{\pi} \int_{\Delta\theta}^{\pi/6} \left\{ -\sqrt{\frac{2}{3}} \, Vdc \cdot \sin(\theta vu) \right\} d\theta \qquad (3\text{-}3)$$

$$= \frac{6}{\pi} \sqrt{\frac{2}{3}} \cdot Vdc \cdot \left( \frac{\sqrt{3}}{2} - \cos(\Delta\theta) \right)$$

$$\text{Vqv\_AV} = \frac{6}{\pi} \int_{\pi/6}^{\pi/3 - \Delta\theta} \left\{ \sqrt{\frac{3}{2}} \, Vdc \cdot \cos\left(\theta vu + \frac{\pi}{6}\right) \right\} d\theta \qquad (3\text{-}4)$$

$$= \frac{6}{\pi} \sqrt{\frac{2}{3}} \cdot Vdc \cdot \left( \cos(\Delta\theta) - \frac{\sqrt{3}}{2} \right)$$

As explained above, average values of inverter output voltages in the qv-axis direction in the section A and the section B are the same except for their polarities. Therefore, when $\Delta\theta$ in both equations are the same, the average value of inverter output voltages in the section AB becomes zero.

As explained above, according to the controller of a power converter of the present embodiment, the average value of the voltage-command vector orthogonal component (the qv-axis component) in the output-voltage average value can be set to zero. Therefore, the precision of an output voltage of the power converter can be improved.

Fourth Embodiment

In the synchronous PWM control explained in the first to third embodiments, examples of embodiments in the same pulse mode such as a synchronous three-pulse mode or a synchronous five-pulse mode have been described. In the present embodiment, an embodiment in different pulse modes, that is, a combination of pulse modes in different numbers of synchronous pulses, is described. Specifically, this embodiment is based on a concept that a switching state in each phase does not change before and after performing switching between synchronous pulse modes, and that there is no negative influence when switching is freely performed at a boundary point between sections for calculating a voltage average value explained in the first to third embodiments.

FIGS. 9(a) to (c) are explanatory diagrams of an operation of a controller according to the fourth embodiment. FIG. 9(b) depicts switching patterns in phases in the synchronous three-pulse mode shown in FIG. 4, and FIG. 9(c) depicts switching patterns in phases in the synchronous five-pulse mode shown in FIG. 6. In these drawings, indexes "3" and "5" are attached to distinguish between a section in the synchronous three-pulse mode and a section in the synchronous five-pulse mode.

In FIG. 9, a boundary point between a section A3 and a section B3 is a boundary point (an operation point in the ii group) in sections for calculating a voltage average value explained in the first to third embodiments, and a switching state in each phase does not change between pulse modes before and after this boundary point. Therefore, this boundary point can be used as a switching timing of both pulse modes. Similarly, each boundary point between "a section C3 and a section D3", "a section E3 and a section F3", "a section G3 and a section H3", "a section I3 and a section J3", and "a section K3 and a section L3" can be also used as a switching timing. That is, there are a plurality of switchable timings in one cycle of a voltage command. Therefore, when a control is performed by using a power converter as a two-level three-phase inverter and by using a synchronous three-pulse mode and a synchronous five-pulse mode, switching between these pulse modes can be performed satisfactorily at an arbitrary boundary point shown by a broken line in FIG. 9.

There are the following advantages when control is performed by combining pulse modes of different numbers of synchronous pulses and also when there are a plurality of switching timings in one cycle of a voltage command.

For example, a pulse mode operation having equivalently changed the number of synchronous pulses can be achieved by continuously using pulse modes of a different number of synchronous pulses at an appropriate rate. More specifically, when a synchronous three-pulse mode and a synchronous five-pulse mode are used at a rate of 1:1, for example, equivalently a four-pulse mode can be achieved from a viewpoint of the number of times of switching per unit time. In this case, by alternately using a synchronous three-pulse mode and a synchronous five-pulse mode for each of the above sections, the reproduction precision can be improved more than that when the pulse modes are switched at each cycle of a voltage command phase.

The rate of using synchronous pulse modes does not have to be the rate of 1:1 mentioned above, and any arbitrary rate can be used. When a synchronous three-pulse mode and a synchronous five-pulse mode are used, there are six sections as selectable sections in one cycle of a voltage command phase (see FIG. 9). With regard to the number of times of using a synchronous three-pulse mode, seven ratios from zero to six times can be selected. Furthermore, with regard to the selection pattern of both pulse modes, a fixed pattern can be used such as a synchronous three-pulse mode is selected two times at the beginning, and then selecting a synchronous five-pulse mode one time, and repeating this pattern, or the pattern can be randomly selected by keeping a set using rate.

In the carrier-wave comparison system or the phase reference system explained in the BACKGROUND ART section, a synchronous pulse mode is switched in principle at each cycle of a voltage command phase. In these systems, it is possible to switch a synchronous pulse mode at plural times in one cycle of a voltage command phase. However, this has a risk of lowering the reproduction precision considerably, generating a large change in an output voltage at the time of switching a synchronous pulse mode, or causing unnecessary switching. Therefore, this switching method cannot be a preferable control method.

Other advantages are as follows. That is, when a pulse mode is temporarily switched to a pulse mode of a large number of synchronous pulses to increase the voltage precision of an inverter, for example, it is not necessary to wait for a lapse of one cycle of a voltage command phase, and this suppresses waste of time.

When a synchronous pulse mode is changed in a relatively long time range, smooth switching can be performed at a high speed by gradually changing a using rate of both pulse modes before and after switching.

As explained above, according to the controller of a power converter of the present embodiment, the controller can have a plurality of switchable timings in one cycle of a voltage command at the time of using a combination of pulse modes of different numbers of synchronous pulses. Therefore, other pulse modes can be performed in high precision by combining plural synchronous pulse modes, and waste of time of switching synchronous pulse mode itself can be also suppressed.

In the first to fourth embodiments described above, switching pattern calculations have been explained for a case of controlling a two-level three-phase inverter in a synchronous three-pulse mode and a case of controlling this inverter in a synchronous five-pulse mode. However, the present invention can be also applied to a multi-level inverter such as a three-level inverter, a multi-phase inverter other than three phases, and an inverter having a larger number of synchronous pulses. That is, according to the controller of a power converter of the above embodiments, the controller can be applied to any kind of a power converter that supplies an alternating-current voltage to a load by using a synchronous PWM control.

Industrial Applicability

As described above, the controller of a power converter according to the present invention is useful for suppressing an error between a voltage command and an inverter output voltage and for responding to a voltage command at a high speed.

The invention claimed is:

1. A controller of a power converter that includes an inverter with a plurality of semiconductor switching elements, and the controller controls the semiconductor switching elements of the inverter by using a pulse width modulation, wherein the controller comprises: a voltage-command signal generator that generates a voltage command signal; and a switching pattern calculator that calculates a switching pattern to control the semiconductor switching elements of the inverter based on the voltage command signal, and wherein the switching pattern calculator calculates a switching pattern of a synchronous PWM system, and outputs a switching pattern in which an output-voltage average value of output voltages output from the inverter equals the voltage command signal, and the controller divides a voltage command phase of the voltage command signal on a stationary coordinate system into x sections, x being 12 or greater, and an average value of output-voltage in the x sections is used for the output-voltage average value.

2. The controller of a power converter according to claim 1, wherein a value on a biaxial orthogonal-rotational-coordinate system is used for the voltage command signal and the output-voltage average value.

3. The controller of a power converter according to claim 2, wherein a component in a voltage-command-signal vector direction on the biaxial orthogonal-rotational-coordinate system is used for the output-voltage average value.

4. The controller of a power converter according to claim 1, wherein a component in a voltage-command-signal vector direction on the biaxial orthogonal-rotational-coordinate system is used for the output-voltage average value.

5. The controller of a power converter according to claim 1, wherein when a switching pattern of the synchronous PWM system is calculated, the switching pattern calculator selects at least one synchronous pulse number from among a plurality of synchronous pulse numbers and performs the calculation while switching the selected synchronous pulse numbers.

6. The controller of a power converter according to claim 2, wherein when a switching pattern of the synchronous PWM system is calculated, the switching pattern calculator selects at least one synchronous pulse number from among a plurality of synchronous pulse numbers and performs the calculation while switching the selected synchronous pulse numbers.

7. The controller of a power converter according to claim 3, wherein when a switching pattern of the synchronous PWM system is calculated, the switching pattern calculator selects at least one synchronous pulse number from among a plurality of synchronous pulse numbers and performs the calculation while switching the selected synchronous pulse numbers.

8. The controller of a power converter according to claim 4, wherein when a switching pattern of the synchronous PWM system is calculated, the switching pattern calculator selects at least one synchronous pulse number from among a plurality of synchronous pulse numbers and performs the calculation while switching the selected synchronous pulse numbers.

9. The controller of a power converter according to claim 5, wherein the switching pattern calculator has at least one timing of switching synchronous pulse numbers in a phase section of the voltage command signal on a stationary coordinate system.

10. The controller of a power converter according to claim 6, wherein the switching pattern calculator has at least one timing of switching synchronous pulse numbers in a phase section of the voltage command signal on a stationary coordinate system.

11. The controller of a power converter according to claim 7, wherein the switching pattern calculator has at least one timing of switching synchronous pulse numbers in a phase section of the voltage command signal on a stationary coordinate system.

12. The controller of a power converter according to claim 8, wherein the switching pattern calculator has at least one timing of switching synchronous pulse numbers in a phase section of the voltage command signal on a stationary coordinate system.

* * * * *